United States Patent [19]

Eouzan et al.

[11] Patent Number: 4,562,471
[45] Date of Patent: Dec. 31, 1985

[54] DIGITAL CIRCUIT FOR THE LEVEL ALIGNMENT OF AN ANALOG SIGNAL

[75] Inventors: Jean Y. Eouzan; Robert Boyer, both of Paris, France

[73] Assignee: Thomson-CSF, Paris, France

[21] Appl. No.: 481,240

[22] Filed: Apr. 1, 1983

[30] Foreign Application Priority Data

Apr. 2, 1982 [FR] France .............................. 82 05783

[51] Int. Cl.$^4$ .............................................. H04N 5/18
[52] U.S. Cl. ................................................. 358/172
[58] Field of Search ................ 358/171, 172, 221, 34, 358/35; 364/602

[56] References Cited

U.S. PATENT DOCUMENTS 4,124,869 11/1978 Heitmann ............................ 358/171
4,473,846 9/1984 Mackereth ........................... 358/172

OTHER PUBLICATIONS

Smpte Journal, vol. 87, No. 1, Janvier 1978 New York (US), Y. Eto et al.

Primary Examiner—Tommy P. Chin
Attorney, Agent, or Firm—Oblon, Fisher, Spivak, McClelland & Maier

[57] ABSTRACT

A digital processing circuit for aligning the d.c. component of an analog television signal. The analog signal is connected to one input of a differential amplifier. The output of the amplifier is connected to an analog to digital converter. The output of this converter forms the output of the entire circuit. A correction loop including an error detection circuit and a digital to analog converter is connected from this output to the second input of the differential amplifier. The error detection circuit includes an averaging circuit, a comparator, an adder and a memory register.

3 Claims, 5 Drawing Figures

DIGITAL CIRCUIT FOR THE LEVEL ALIGNMENT OF AN ANALOG SIGNAL

BACKGROUND OF THE INVENTION

The present invention relates to digital processing circuits for signals, particularly television signals, and more specifically a digital circuit for the alignment of the useful direct current component of an analog signal in such processing circuits.

In a signal processing system, the useful d.c. component of the process signal may become lost. It is indispensable to restore it before using the signal, in order to restore the information contained in said signal in an appropriate manner.

Conventionally, in digital processing circuits for initially analog signals, the d.c. component of the signal is restored or the alignment of a level of this signal (e.g. the block level for a television signal) with a reference level, is carried out by processing an analog signal, prior to digital conversion by an analog circuit. This circuit comprises a switch gate determining the intervals during which the reference level is fixed and a capacitance acting as a memory, which also has a filtering effect for the noise which may be present on the level taken as a basis for the alignment.

When this level alignment takes place in this way on the analog signal, it is necessary for the analog-digital converter which then processes the signal to convert it into a digital signal to be very stable. Otherwise, the drifts or variations introduced cannot be corrected and, even if stabilization has taken place on the analog signal, there still remains drifts in the output signal.

Moreover, such an analog alignment circuit involves a compromise between the establishment speed and the stability. Thus, a short establishment time requires a limited capacity, whereas a good stability requires a relatively large capacity. Moreover, in view of the leakage current of the circuit, the correction must take place at an adequate frequency.

SUMMARY OF THE INVENTION

The invention relates to a level alignment digital circuit or so-called digital clamp circuit, which obviates the aforementioned disadvantages of the analog circuit preceding the converter. The corrections carried out by this circuit cover the compensation of possible drifts of the analog-digital converter of the digital processing circuit, has a short establishment time and a maintenance time which is as long as required, whilst involving no compromise between the speed and stability.

The present invention therefore relates to a digital circuit for the alignment of the level of an analog signal having porches to be aligned on a reference level ($V_R$) having an input ($E_{video}$) coupled to the input of an analog-digital converter and a digital output ($S_N$), wherein it also comprises a digital error detection and correction calculation circuit having a signal input connected to the digital output ($S_N$) and having a memory circuit for storing the calculated digital correction values having an output forming the output of a digital detection circuit, a sequencer receiving the alignment pulses during the porches of the input signal and controlling the digital detection circuit, a digital-analog converter coupled to the output of the detection circuit for supplying an analog correction signal maintained between two successive alignment pulses, said signal being combined with the input signal in order that, at the output ($S_N$) of the circuit, the digital values associated with the porches of the input signal are brought to the value associated with the reference level.

BRIEF DESCRIPTION OF THE DRAWINGS

The invention is described in greater detail hereinafter relative to non-limitative embodiments and the attached drawings, wherein.

DETAILED DESCRIPTION OF THE INVENTION

As stated hereinbefore, it is vital to restore the d.c. component of an image signal for an appropriate restoration of the images or pictures. Conventionally in television, this restoration takes place by maintaining the blanking level at a reference value $V_R$, said blanking level being the zero luminances or black level. This alignment is brought about by setting the image signal to its reference value at a given time, included in the duration of the time blanking signal and determined by pulses at the line frequency, called alignment pulses.

Figure 1:
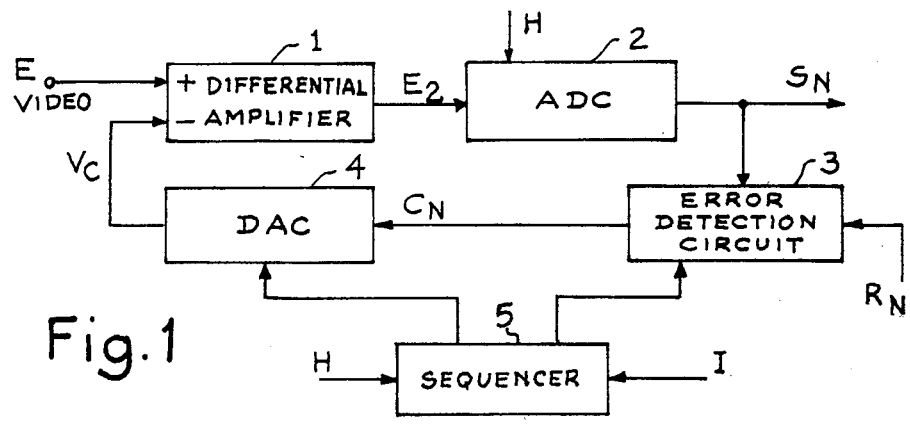
FIG. 1 is a block diagram of the digital level alignment circuit according to the invention.

The level alignment circuit according to the invention includes the analog-digital converter in the loop in order to compensate possible drifts thereof. FIG. 1 is a block diagram of this circuit, which comprises a video analog signal input $E_{video}$ connected to a first input ($+$) of a differential amplifier 1. The output of this amplifier is connected to the signal input $E_2$ of the analog-digital converter ADC 2 having a timing input with a signal H at the sampling frequency and whose output $S_N$ supplies the digital signal. For aligning the level of the signal, output $S_N$ is connected to the input of an error detection and correction calculation circuit 3, whose output supplies, on the basis of the error detected between the digital value of the amplitude at reference times and the digitized value which this amplitude must have at the same times, a digital correction value taking account of the aforementioned correction. The output of this error circuit 3 is connected to the input 1 of a digital-analog converter DAC 4, whose output is connected to the second input ($-$) of the differential amplifier. The error detection circuit 3 and the digital-analog converter 4 have control inputs connected to outputs of a sequencer 5 receiving a control signal I, constituted by alignment pulses at the frequency of the analog signal (e.g. line frequency of the video signal), said pulses coinciding with the porches of the analog signal, which must be fixed to the reference level (e.g. black in a video signal). The sequencer 5 also receives a timing signal H at the sampling frequency of the analog-digital converter. In this embodiment, the dynamics and resolution of the DAC must be comparable to those of the ADC.

The operating details of this circuit will be given hereinafter in conjunction with the description of two embodiments.

When the dynamics $D_{AN}$ of the analog-digital converter is double that of D of the signal, the so-called bipolar converter still supplies at its output, characteristic samples of the analog value of the input signal. In particular during the line blanking porch, the samples must be directly used for calculating the error between the amplitudes of these samples and the amplitude which they should have if the black level was fixed.

Figure 3:
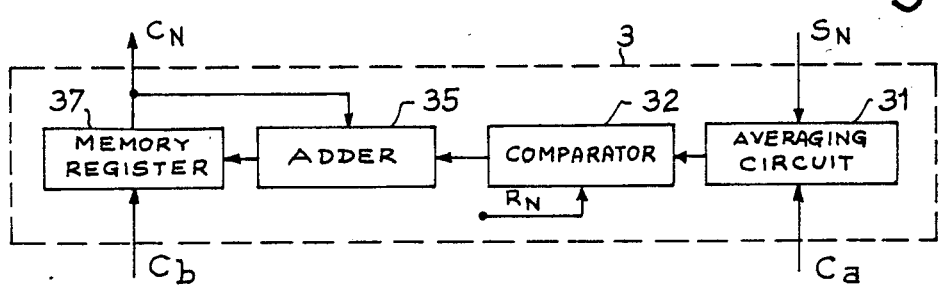
FIG. 3 is a diagram of the error detection and correction calculation circuit for a circuit comprising a "bipolar" analog-digital converter.

In this case, the error detection and correction calculation circuit 3 has, in the manner shown in FIG. 3, an averaging circuit 31 controlled by a control signal $C_a$ formed by pulses at the sampling frequency F during the alignment pulse. This averaging circuit makes it possible to filter the noise present on the porch, taken as the reference, of the input signal. The output of the averaging circuit is connected to the first input of a comparator 32 receiving at its other input the digital value $R_N$ corresponding to the reference level $V_R$. Its output is connected to the first input of an adder 35, whereof the output is connected to the input of a memory register 37, which supplies the digital correction value $C_N$ applied to the second input of adder 35 and to the input of the digital-analog converter 4. The latter supplies an analog correction signal $V_C$ superimposed on the input signal during the line to bring the level of the porch to the reference level and appropriately displace the remainder of the line. The memory register and adder are controlled by a control signal $C_b$ triggered at the end of the alignment pulses.

Figure 2:
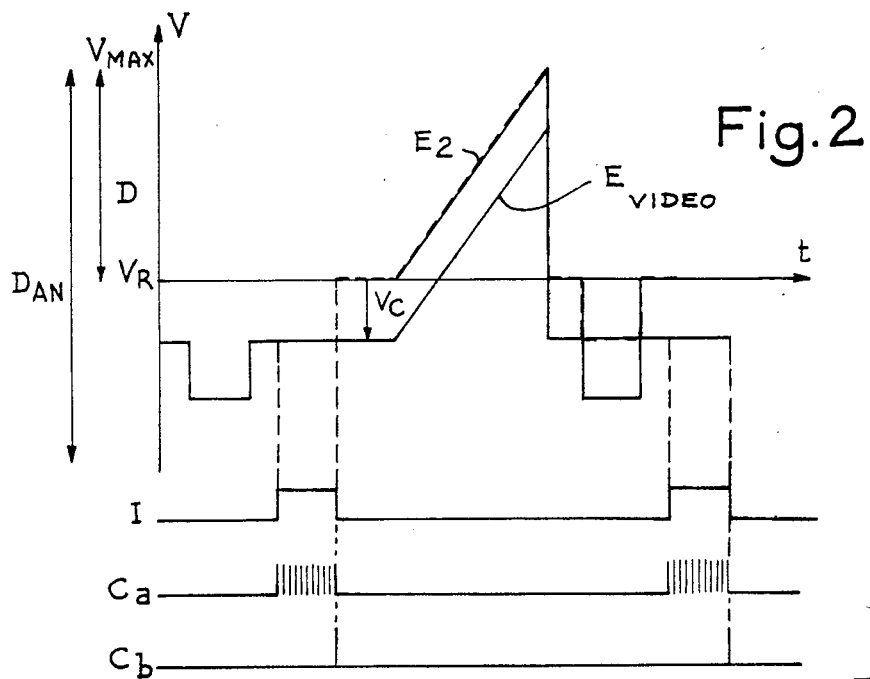
FIG. 2 is a diagram of the signal processed by this device.

FIG. 2 shows the diagram of the video television signal. For a complete line, the signal is constituted by a line synchronization pulse of predetermined amplitude and duration, a blanking porch corresponding to the absolute black and, for a line varying in continuous manner from black to white, a luminance ramp. It is also possible to see the alignment pulses I and the control signals $C_a$ and $C_b$ respectively applied to the averaging circuit and to the DAC. This type of alignment circuit is of particular interest in the case of the digital processing of the infrared video signal and more generally for the processing of very low frequency signals.

When the dynamic $D_{AN}$ of the ADC is roughly equal to that D of the signal, the converter is said to be unipolar and the circuit is slightly different, because it is not possible to directly determine an error signal on the basis of the samples considered during the alignment pulse. Thus, when the dynamics of the ADC is, for example, OV to $V_{MAX}$ and the video signal at the input is such that the line blanking porch has a negative level $V_N$, the ADC supplies at its output the same digital value, i.e. 0 (on 8 bits if the converter supplies values of 8 bits) for any input signal below the lower limit of the dynamics (OV). In the same way, when the signal is displaced towards positive values, the converter supplies the same digital values, i.e. 1 (on 8 bits) for any input signal above the upper limit ($V_{max}$).

In this case, the alignment in two phases. In a first phase, during the first sampling periods of the alignment pulses, the circuit carries out a rough prealignment of the video signal in order to bring the level of the porch taken as a basis within the input dynamics of the ADC. In a second phase, on the basis of samples taken after the rough alignment, a fine error signal is determined by averaging the differences between the values of these samples and the digital reference $R_N$ corresponding to the reference level $V_R$ of the porch. In order to appropriately carry out this fine alignment, it is indispensable to fix the reference level $V_R$ of the porch at a different value to that associated with the lower limit of the dynamics of the ADC, so as to be able to distinguish a signal below said reference level from a signal having this level.

During this second phase, the digital correction value $C_N$ applied to the input of the DAC is that determined during the rough alignment and at the end of this phase, fine alignment of the signal takes place by modifying the digital correction value applied to the input of the DAC.

Finally, in a third optional phase, by averaging the samples and comparing the mean value with the digital reference, it is possible to confirm, via the DAC, the correction signal to be applied during the remainder of the line.

Figure 4:
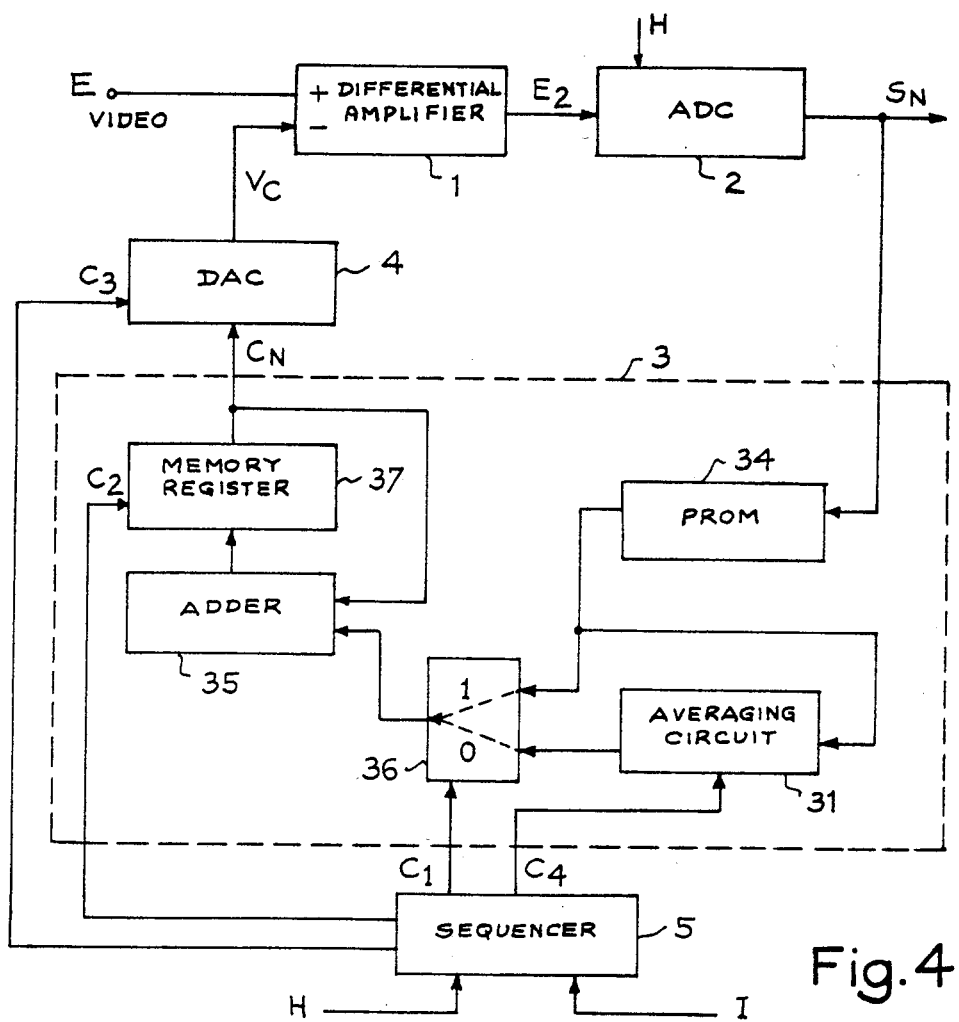
FIG. 4 is a detailed block diagram of a second embodiment of this circuit with a "unipolar" analog-digital converter.

FIG. 4 is an example of a more detailed block diagram of the circuit of FIG. 1 for this embodiment. The error detection and correction calculation circuit 3, in this embodiment, comprises a programmed memory 34, whose input is connected to the digital output $S_N$ of ADC 2. The output of the memory is connected to the first input of an adder 35, via a multiplexer 36 having two inputs and an output. The output of this adder is connected to the input of a memory register 37, whose output is connected to the input of the DAC 4. This output is also connected to the second input of the adder 35. The error detection circuit also comprises, for the second phase, an averaging circuit 31, whose input is connected to the output of the programmed memory 34 and whose output is connected to the second input of multiplexer 36.

Figure 5:
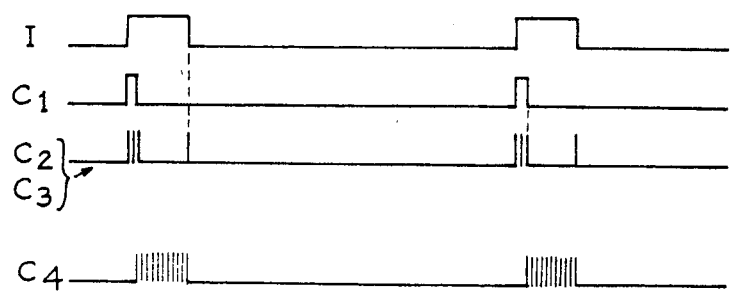
FIG. 5 is a signal diagram.

The sequencer 5 divides the alignment pulses I applied to its control input into two zones, corresponding to the two processing phases and generates control signals $C_1, C_2, C_3, C_4$ represented in FIG. 5 and described hereinafter. The control input of multiplexer 36 is connected to a first output of sequencer 5, which supplies signal $C_1$ in state 1 during the first phase of the alignment pulse. The signal transmitted to the output of multiplexer 36 is respectively the signal present at its first or its second input, depending on whether the control signal $C_1$ is in state 1 or zero.

During the first phase (signal $C_1$ in state 1), the rough prealignment takes place with a timing, which must take account of the transit time in the converter. For example, if the conversion is carried out at a sampling frequency F, the transit time is equivalent to n sampling periods or cycles. By applying a given digital correction value, the corresponding effect on the control is only realized after n timing pulses. Consequently, during this first phase, the sequencer 5 supplies the memory register 36 and the DAC 4, with control signals $C_2$ and $C_3$ at frequency F/n and slightly displaced.

On the basis of samples supplied by the ADC during the high state of the control signal $C_1$, the read-only memory 34 defines the digital error value to be superimposed on the preceding digital correction value in adder 35 in order to define the new correction value to be applied to the DAC. The generated analog correction signal brings the considered porch to a level included in the dynamics of the ADC. The digital value $V_N$ of these samples are considered relative to three particular values, namely the upper and lower limits of the converter dynamics and the digital value RN of the reference level associated with the reference porch which, as indicated hereinbefore, is given a value differing from the lower limit of the dynamics.

The read-only memory 34 supplies the following digital error values:

If $V_N = 1111$, i.e. the upper limit of the ADC dynamics, memory 34 supplies a maximum digital error value equal to e.g. half the dynamics of the ADC and the digital correction value $C_N$ applied to the DAC is the preceding value reduced by this error value.

If $R_N < V_N < 1111$, then the digital error value is $V_N - R_N$ and the rough digital correction value applied to the DAC is the preceding value reduced by this error value.

If $V_N = R_N$ (or very close lhereto), the digilal correction value of the preceding line is not changed.

If $0000 < V_N < R_N$, then the digital error value is $R_N - V_N$ and the rough digital correction value applied to the DAC is the preceding value increased by this error.

If $V_N = 0000$, i.e. the lower limit of the ADC dynamics, the memory supplies a maximum digital error value equal e.g. to half the ADC dynamics and the digital correction value is the preceding value increased by this error value.

In summarizing, during the rough correction phase, the programmed memory 34 supplies the error value $R_N - V_N$, with its sign, which is algebraically added to the preceding digital correction value by adder 35 when the blanking level is within the ADC dynamics and a maximum value $V_{MAX}$ with the sign determining the displacement direction, when the blanking level is outside the ADC dynamics.

During the second phase, the programmed memory 34 still supplies the error $R_N - V_N$ with its sign and this error is transmitted to the averaging circuit 31, which makes it possible to filter the noise, whilst taking account of all the samples of the second phase. For this purpose, the averaging circuit 31 is controlled by a signal $C_4$ formed by pulses at the sampling frequency F during the second phase of the alignment pulse.

At the end of the second phase, adder 35 takes account of the output of the averaging circuit and on the basis of the preceding correction value calculates a new correction value recorded in memory register 37 and transmits it to the digital-analog converter for locking the blanking level during the remainder of the line. For this purpose, the control signals $C_2$ and $C_3$ have a timing pulse at the end of the second phase.

It is also possible to provide a third phase during the end of the alignment pulse, the sequencer supplying corresponding control signals $C_2$, $C_3$, $C_4$ for carrying out a detection similar to that performed during the second phase, in order to confirm the accuracy of the values stored at the end of said second phase.

The invention is not limited to the embodiments described and shown. In particular, in the embodiments described, the averaging circuit processes the digital values of the samples at the output of the ADC. However, it is also possible to carry out analog averaging by placing an integrator between the differential amplifier and the ADC. This integrator is then only active during the useful phase of the alignment pulse.

Furthermore, instead of using a differential amplifier for carrying out the alignment on the basis of the digital correction value converted into an analog signal, it is possible to eliminate this amplifier and directly vary the reference voltages of the ADC.

What is claimed is:

1. A digital circuit for the alignment of the level of an analog input signal having porches to be aligned on a reference level comprising:
   an input for receiving the analog input signal;
   combining means;
   an analog to digital converter coupled by said combining means to said input and having an output;
   a digital output coupled to the output of the analog to digital converter;
   an error detection and correction calculation circuit having a signal input connected to the digital output, having an output and having a memory circuit for storing calculated digital correction values, said memory circuit having an input coupled to the input of the error detection and correction calculation circuit and an output forming the output of the error detection and correction calculation circuit;
   a sequencer for receiving an alignment pulse during the duration of each porch of the analog input signal and for controlling the error detection and correction calculation circuit in synchronism with said pulse; and
   a digital to analog converter coupled to the output of the error detection and correction calculation circuit for supplying an analog correction signal maintained between two successive alignment pulses to said combining means.

2. A digital circuit according to claim 1, wherein the error detection and correction calculation circuit comprises:
   comparison means coupled to said digital output having an output for comparing a digital value associated with a reference level with digital values associated with the level of the porches of the analog input signal and an adder having an output coupled to the input of said memory circuit and first and second inputs respectively connected to the output of the comparing means and to the output of the memory circuit.

3. A digital circuit according to claim 2, wherein the digital values associated with the level of the porches of the analog input signal are average digital values, the digital circuit further comprising an averaging circuit having two inputs respectively coupled to the digital output and the sequencer and an output coupled to said comparison means to provide said average digital values.

* * * * *